United States Patent
Wiener et al.

(10) Patent No.: US 11,356,343 B2
(45) Date of Patent: *Jun. 7, 2022

(54) SPLITTING NETWORK DISCOVERY PAYLOADS BASED ON DEGREE OF RELATIONSHIPS BETWEEN NODES

(71) Applicant: ServiceNow, Inc., Santa Clara, CA (US)

(72) Inventors: David Wiener, Petach Tikva (IL); Yair Leibkowiz, Petach Tikva (IL); Haviv Rosh, Petach Tikva (IL); Yuval Rimar, Petach Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 16/884,826

(22) Filed: May 27, 2020

(65) Prior Publication Data
US 2020/0287808 A1      Sep. 10, 2020

Related U.S. Application Data

(63) Continuation of application No. 15/655,284, filed on Jul. 20, 2017, now Pat. No. 10,673,715.

(51) Int. Cl.
*H04L 43/0882*    (2022.01)
*H04L 43/045*     (2022.01)
(Continued)

(52) U.S. Cl.
CPC ........ *H04L 43/045* (2013.01); *H04L 41/0806* (2013.01); *H04L 41/0853* (2013.01);
(Continued)

(58) Field of Classification Search
None
See application file for complete search history.

(56) References Cited

U.S. PATENT DOCUMENTS

| 5,978,594 A | 11/1999 | Bonnell |
| 6,321,229 B1 | 11/2001 | Goldman |

(Continued)

FOREIGN PATENT DOCUMENTS

WO    2015/070189 A1    5/2015

*Primary Examiner* — Nasser M Goodarzi
*Assistant Examiner* — Terrika Peterson
(74) *Attorney, Agent, or Firm* — Fletcher Yoder PC

(57) ABSTRACT

An example embodiment may involve performing a discovery process to identify configuration items representing computing devices and applications in a managed network and determining that the configuration items exceed a threshold payload size. The embodiment may then involve generating a graph that represents the configuration items as nodes interconnected by unidirectional edges. The edges may represent respective associations between pairs of configuration items to which they connect, and the respective associations are classified either as weak associations that represent non-dependency relationships between a respective pair of nodes or as strong associations that represent dependency relationships between the respective pair of nodes. The embodiment may involve dividing the graph into overlapping sub-graphs based on the respective associations represented by the edges and, for each sub-graph, separately transmitting the configuration items defined therein to one or more server devices.

20 Claims, 14 Drawing Sheets

(51) Int. Cl.
*H04L 67/565* (2022.01)
*H04L 41/0806* (2022.01)
*H04L 41/12* (2022.01)
*H04L 41/0853* (2022.01)
*H04L 41/0866* (2022.01)
*H04L 67/56* (2022.01)
*H04L 41/0654* (2022.01)

(52) U.S. Cl.
CPC .......... *H04L 41/0866* (2013.01); *H04L 41/12* (2013.01); *H04L 67/28* (2013.01); *H04L 67/2823* (2013.01)

(56) References Cited

U.S. PATENT DOCUMENTS

| | | | | |
|---|---|---|---|---|
| 6,477,572 | B1 | 11/2002 | Elderton et al. | |
| 6,609,122 | B1 | 8/2003 | Ensor | |
| 6,799,189 | B2 | 9/2004 | Huxoll | |
| 6,816,898 | B1 | 11/2004 | Scarpelli | |
| 6,895,586 | B1 | 5/2005 | Brasher | |
| 7,020,706 | B2 | 3/2006 | Cates | |
| 7,027,411 | B1 | 4/2006 | Pulsipher | |
| 7,028,301 | B2 | 4/2006 | Ding | |
| 7,062,683 | B2 | 6/2006 | Warpenburg | |
| 7,131,037 | B1 | 10/2006 | LeFaive | |
| 7,170,864 | B2 | 1/2007 | Matharu | |
| 7,350,209 | B2 | 3/2008 | Shum | |
| 7,392,300 | B2 | 6/2008 | Anantharangachar | |
| 7,610,512 | B2 | 10/2009 | Gerber | |
| 7,617,073 | B2 | 11/2009 | Trinon | |
| 7,685,167 | B2 | 3/2010 | Mueller | |
| 7,689,628 | B2 | 3/2010 | Garg | |
| 7,716,353 | B2 | 5/2010 | Golovinsky | |
| 7,769,718 | B2 | 8/2010 | Murley | |
| 7,783,744 | B2 | 8/2010 | Garg | |
| 7,877,783 | B1 | 1/2011 | Cline | |
| 7,890,802 | B2 | 2/2011 | Gerber | |
| 7,925,981 | B2 | 4/2011 | Pourheidari | |
| 7,930,396 | B2 | 4/2011 | Trinon | |
| 7,933,927 | B2 | 4/2011 | Dee | |
| 7,941,506 | B2 | 5/2011 | Bonal | |
| 7,945,860 | B2 | 5/2011 | Vambenepe | |
| 7,966,398 | B2 | 6/2011 | Wiles | |
| 8,051,164 | B2 | 11/2011 | Peuter | |
| 8,082,222 | B2 | 12/2011 | Rangarajan | |
| 8,224,683 | B2 | 7/2012 | Manos | |
| 8,266,096 | B2 | 9/2012 | Navarrete | |
| 8,346,752 | B2 | 1/2013 | Sirota | |
| 8,380,645 | B2 | 2/2013 | Kowalski | |
| 8,402,127 | B2 | 3/2013 | Solin | |
| 8,406,230 | B2 | 3/2013 | Lu | |
| 8,457,928 | B2 | 6/2013 | Dang | |
| 8,478,569 | B2 | 7/2013 | Scarpelli | |
| 8,554,750 | B2 | 10/2013 | Rangaranjan | |
| 8,612,408 | B2 | 12/2013 | Trinon | |
| 8,646,093 | B2 | 2/2014 | Myers | |
| 8,674,992 | B2 | 3/2014 | Poston | |
| 8,683,032 | B2 | 3/2014 | Spinelli | |
| 8,743,121 | B2 | 6/2014 | De Peuter | |
| 8,745,040 | B2 | 6/2014 | Kowalski | |
| 8,812,539 | B2 | 8/2014 | Milousheff | |
| 8,818,994 | B2 | 8/2014 | Kowalski | |
| 8,832,652 | B2 | 9/2014 | Meuller | |
| 8,887,133 | B2 | 11/2014 | Behnia | |
| 8,907,988 | B2 | 12/2014 | Poston | |
| 9,015,188 | B2 | 4/2015 | Behne | |
| 9,037,536 | B2 | 5/2015 | Vos | |
| 9,065,783 | B2 | 6/2015 | Ding | |
| 9,098,322 | B2 | 8/2015 | Ding | |
| 9,122,552 | B2 | 9/2015 | Whitney | |
| 9,137,115 | B2 | 9/2015 | Mayfield | |
| 9,239,857 | B2 | 1/2016 | Trinon | |
| 9,261,372 | B2 | 2/2016 | Cline | |
| 9,317,327 | B2 | 4/2016 | Apte | |
| 9,323,115 | B2 | 4/2016 | Guo et al. | |
| 9,323,644 | B1* | 4/2016 | Hale | G06F 8/22 |
| 9,363,252 | B2 | 6/2016 | Meuller | |
| 9,419,854 | B1* | 8/2016 | Wang | H04L 41/0654 |
| 9,432,298 | B1 | 8/2016 | Smith | |
| 9,412,084 | B2 | 9/2016 | Kowalski | |
| 9,467,344 | B2 | 10/2016 | Gere | |
| 9,534,903 | B2 | 1/2017 | Cline | |
| 9,535,737 | B2 | 1/2017 | Joy | |
| 9,557,879 | B1 | 1/2017 | Wang et al. | |
| 9,557,969 | B2 | 1/2017 | Sharma | |
| 9,578,484 | B2 | 2/2017 | Xiong | |
| 9,613,070 | B2 | 4/2017 | Kumar | |
| 9,631,934 | B2 | 4/2017 | Cline | |
| 9,645,833 | B2 | 5/2017 | Mueller | |
| 9,654,473 | B2 | 5/2017 | Miller | |
| 9,659,051 | B2 | 5/2017 | Hutchins | |
| 9,766,935 | B2 | 9/2017 | Kelkar | |
| 9,792,387 | B2 | 10/2017 | George | |
| 9,805,322 | B2 | 10/2017 | Kelkar | |
| 9,852,165 | B2 | 12/2017 | Morozov | |
| 9,967,162 | B2 | 5/2018 | Spinelli | |
| 10,002,203 | B2 | 6/2018 | George | |
| 10,044,566 | B1 | 8/2018 | Grisco | |
| 2002/0156893 | A1* | 10/2002 | Pouyoul | G06Q 10/10 709/225 |
| 2004/0061701 | A1* | 4/2004 | Arquie | H04L 43/0882 345/440 |
| 2005/0091356 | A1 | 4/2005 | Izzo | |
| 2008/0300834 | A1* | 12/2008 | Wiemer | G06F 30/3323 703/2 |
| 2009/0144285 | A1 | 5/2009 | Chatley et al. | |
| 2009/0198836 | A1* | 8/2009 | Wittenschlaeger | G06F 15/16 709/253 |
| 2009/0234996 | A1 | 9/2009 | Bugenhagen | |
| 2010/0080145 | A1 | 4/2010 | Frietsch et al. | |
| 2014/0219103 | A1 | 8/2014 | Vasseur et al. | |
| 2014/0244818 | A1 | 8/2014 | Taine et al. | |
| 2015/0082432 | A1 | 3/2015 | Eaton et al. | |
| 2015/0188879 | A1* | 7/2015 | Cha | H04L 41/5035 709/223 |
| 2016/0098305 | A1 | 4/2016 | Busca et al. | |
| 2016/0110228 | A1 | 4/2016 | Zhang | |
| 2016/0192029 | A1 | 6/2016 | Bergstrom | |
| 2017/0161282 | A1* | 6/2017 | Kemme | G06F 9/542 |
| 2017/0177685 | A1* | 6/2017 | Becker | G06F 16/2282 |
| 2018/0146049 | A1 | 5/2018 | Africa et al. | |
| 2018/0191818 | A1 | 7/2018 | Maddali et al. | |
| 2018/0295044 | A1 | 10/2018 | Johnson et al. | |
| 2018/0322599 | A1 | 11/2018 | Srivastava et al. | |
| 2018/0367389 | A1 | 12/2018 | Biazetti et al. | |

* cited by examiner

SPLITTING NETWORK DISCOVERY PAYLOADS BASED ON DEGREE OF RELATIONSHIPS BETWEEN NODES

CROSS REFERENCE TO RELATED APPLICATIONS

This application is a continuation of U.S. patent application Ser. No. 15/655,284, filed on Jul. 20, 2017; the contents of which is incorporated herein in its entirety by reference.

BACKGROUND

Computer networks may involve dozens or hundreds of computing devices, each operating various software applications. Also referred to as configuration items, computing devices and applications may support and/or facilitate higher-level or end-to-end services. As such, network tools can be used to discover and identify configuration items operating within a network as well as the connectivity between configuration items in order to process and convey the current environment of the network.

In some applications, network tools may represent information about the configuration items as well as their associations using a set of web portals, services, and applications available to particular devices. For instance, configuration items information may be graphically represented as nodes with the connectivity of these configuration items represented as edges extending between nodes.

In some cases, however, the amount of information associated with the configuration items may become too large for the communication channels used by the network tools. In particular, the communication channels may not have the capacity to receive information pertaining to a payload of a large number of configuration items discovered within a network.

SUMMARY

The embodiments herein improve upon transmission of large payloads of configuration items discovered within a network by intelligently dividing the payload into multiple portions for subsequent transfer using multiple transmissions. Particularly, a system may initially discover configuration items in a managed network to determine the current environment of the managed network. Upon determining that the payload of discovered configuration items exceeds a threshold payload size, the system may generate a graph that represents each discovered configuration item as a node and further includes edges between nodes representing associations between pairs of the configuration items. The system may utilize the graph to determine multiple sub-graphs based on the degrees of relationships between the nodes. In doing so, the large payload of configuration items that exceeded the threshold payload size can be divided in smaller portions and transmitted in a series via one or more communication channels until the entire payload is completely transmitted.

Accordingly, a first example embodiment may involve a proxy server application disposed within a managed network. In particular, the managed network includes computing devices configured to execute applications. The embodiment may also involve one or more server devices disposed within a remote network management platform. The remote network management platform manages the managed network and the one or more server devices are configured to obtain information regarding the computing devices and the applications by way of the proxy server application. The proxy server application is configured to perform a discovery process to identify configuration items representing the computing devices and the applications, and determine that the configuration items exceed a threshold payload size. Based on determining that the configuration items exceed the threshold payload size, the proxy server application is configured to generate a graph that represents the configuration items as nodes interconnected by unidirectional edges. The edges represent respective associations between pairs of configuration items to which they connect. The respective associations are classified either as weak associations that represent non-dependency relationships between a respective pair of nodes or as strong associations that represent dependency relationships between the respective pair of nodes. The proxy server application is further configured to divide the graph into overlapping sub-graphs based on the respective associations represented by the edges. For instance, a particular sub-graph is populated by recursively traversing and copying nodes and edges from the graph as long as (i) nodes in the particular sub-graph represent fewer configuration items than the threshold payload size, and (ii) for any first node with an outgoing edge representing a strong association to a second node, the second node is in the sub-graph. As such, each sub-graph represents a portion of a payload of the configuration items. The proxy server application is further configured to separately transmit to the one or more server devices, for each sub-graph, the configuration items defined therein.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, an example method may involve performing operations in accordance with the first example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment.

In a fifth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
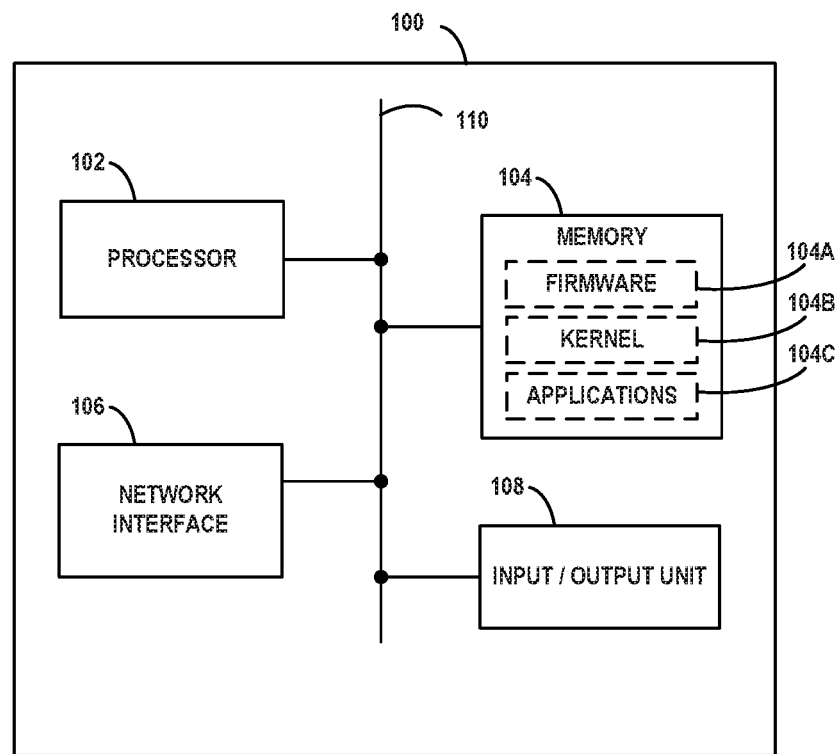
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer, create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
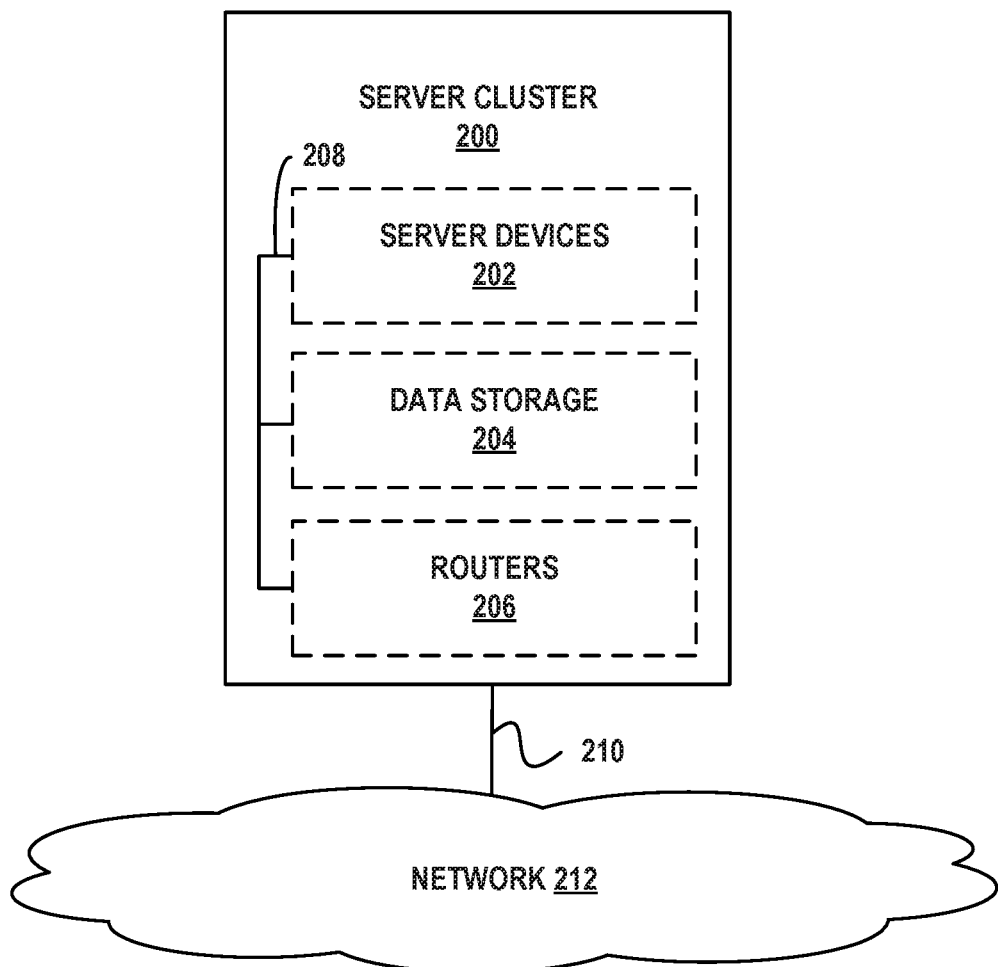
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
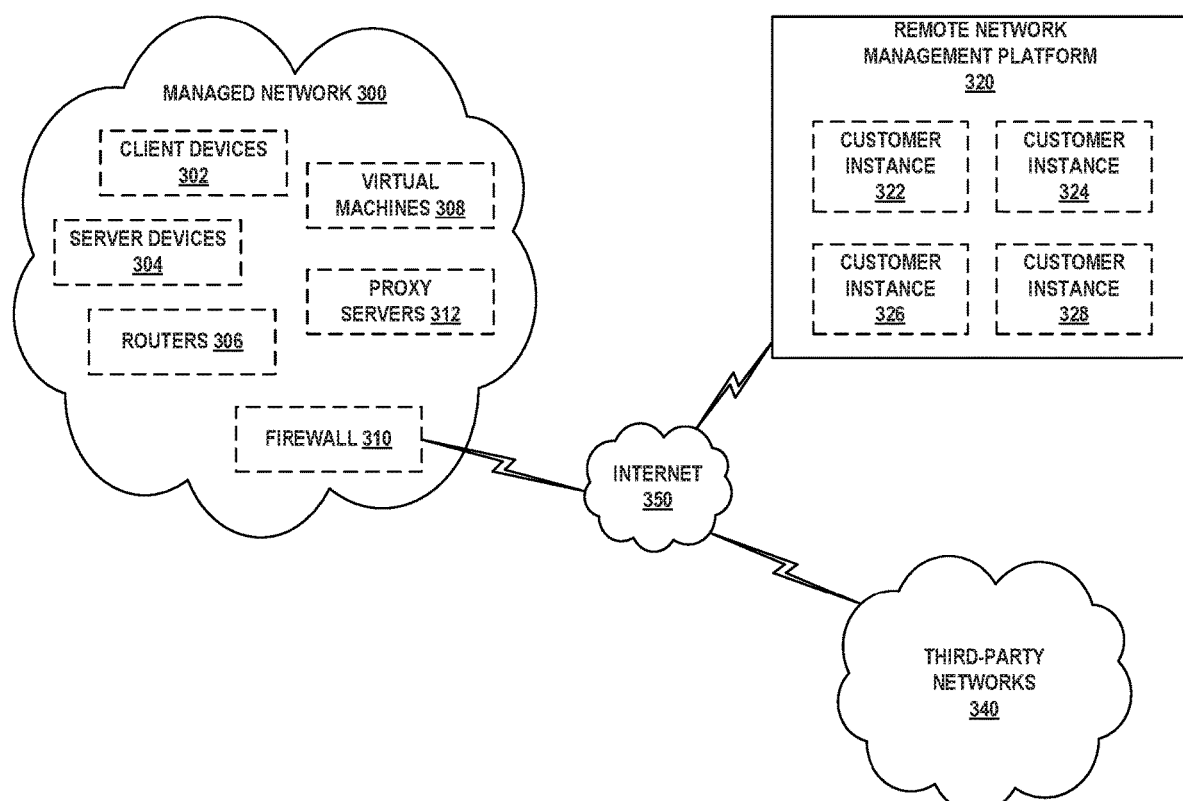
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG.

3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more customer instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four customer instances 322, 324, 326, and 328. Each of these instances may represent a set of web portals, services, and applications (e.g., a wholly-functioning aPaaS system) available to a particular customer. In some cases, a single customer may use multiple customer instances. For example, managed network 300 may be an enterprise customer of remote network management platform 320, and may use customer instances 322, 324, and 326. The reason for providing multiple instances to one customer is that the customer may wish to independently develop, test, and deploy its applications and services. Thus, customer instance 322 may be dedicated to application development related to managed network 300, customer instance 324 may be dedicated to testing these applications, and customer instance 326 may be dedicated to the live operation of tested applications and services.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other customer instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple customer instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, customer instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
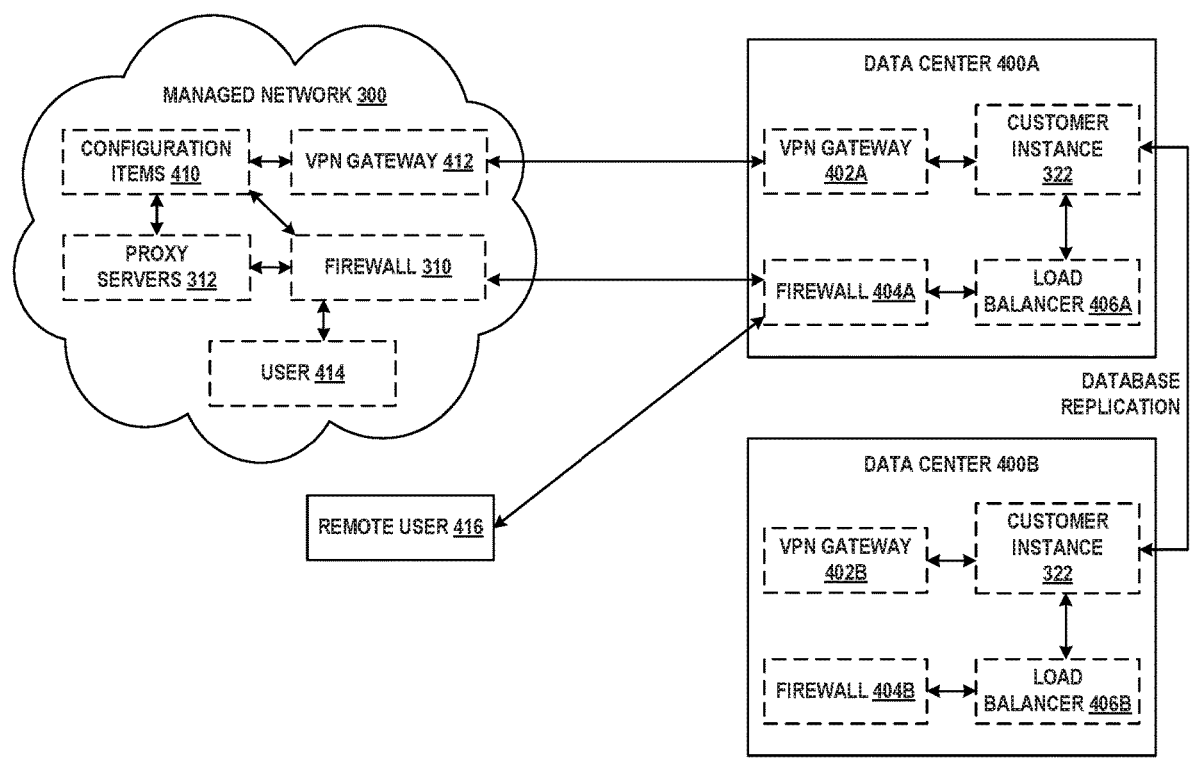
FIG. 4 depicts a communication environment involving a remote network management architecture, in accordance with example embodiments.

FIG. 4 further illustrates the communication environment between managed network 300 and customer instance 322, and introduces additional features and alternative embodiments. In FIG. 4, customer instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC). Firewall 404A may be configured to allow access from authorized users, such as user 414 and remote user 416, and to deny access to unauthorized users. By way of firewall 404A, these users may access customer instance 322, and possibly other customer instances. Load balancer 406A may be used to distribute traffic amongst one or more physical or virtual server devices that host customer instance 322. Load balancer 406A may simplify user access by hiding the internal configuration of data center 400A, (e.g., customer instance 322) from client devices. For instance, if customer instance 322 includes multiple physical or virtual computing devices that share access to multiple databases, load balancer 406A may distribute network traffic and processing tasks across these computing devices and databases so that no one computing device or database is significantly busier than the others. In some embodiments, customer instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, customer instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of customer instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of customer instance 322 with one or more Internet Protocol (IP) addresses of data center 400A may re-associate the domain name with one or more IP addresses of data center 400B. After this re-association completes (which may take less than one second or several seconds), users may access customer instance 322 by way of data center 400B.

FIG. 4 also illustrates a possible configuration of managed network 300. As noted above, proxy servers 312 and user 414 may access customer instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by customer instance 322, or relationships between discovered devices, applications, and services. Configuration items may be represented in a configuration management database (CMDB) of customer instance 322.

As noted above, VPN gateway 412 may provide a dedicated VPN to VPN gateway 402A. Such a VPN may be helpful when there is a significant amount of traffic between managed network 300 and customer instance 322, or security policies otherwise suggest or require use of a VPN between these sites. In some embodiments, any device in managed network 300 and/or customer instance 322 that directly communicates via the VPN is assigned a public IP address. Other devices in managed network 300 and/or customer instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
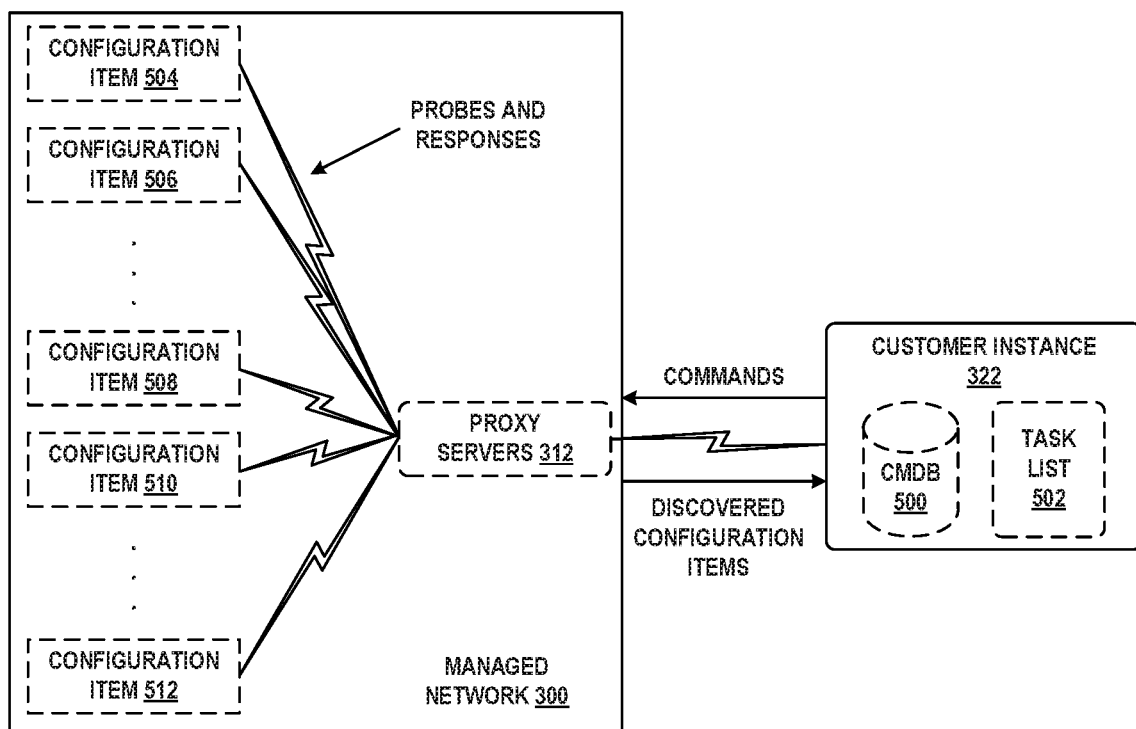
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within customer instance 322. Customer instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of customer instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, customer instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., webservers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, as a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
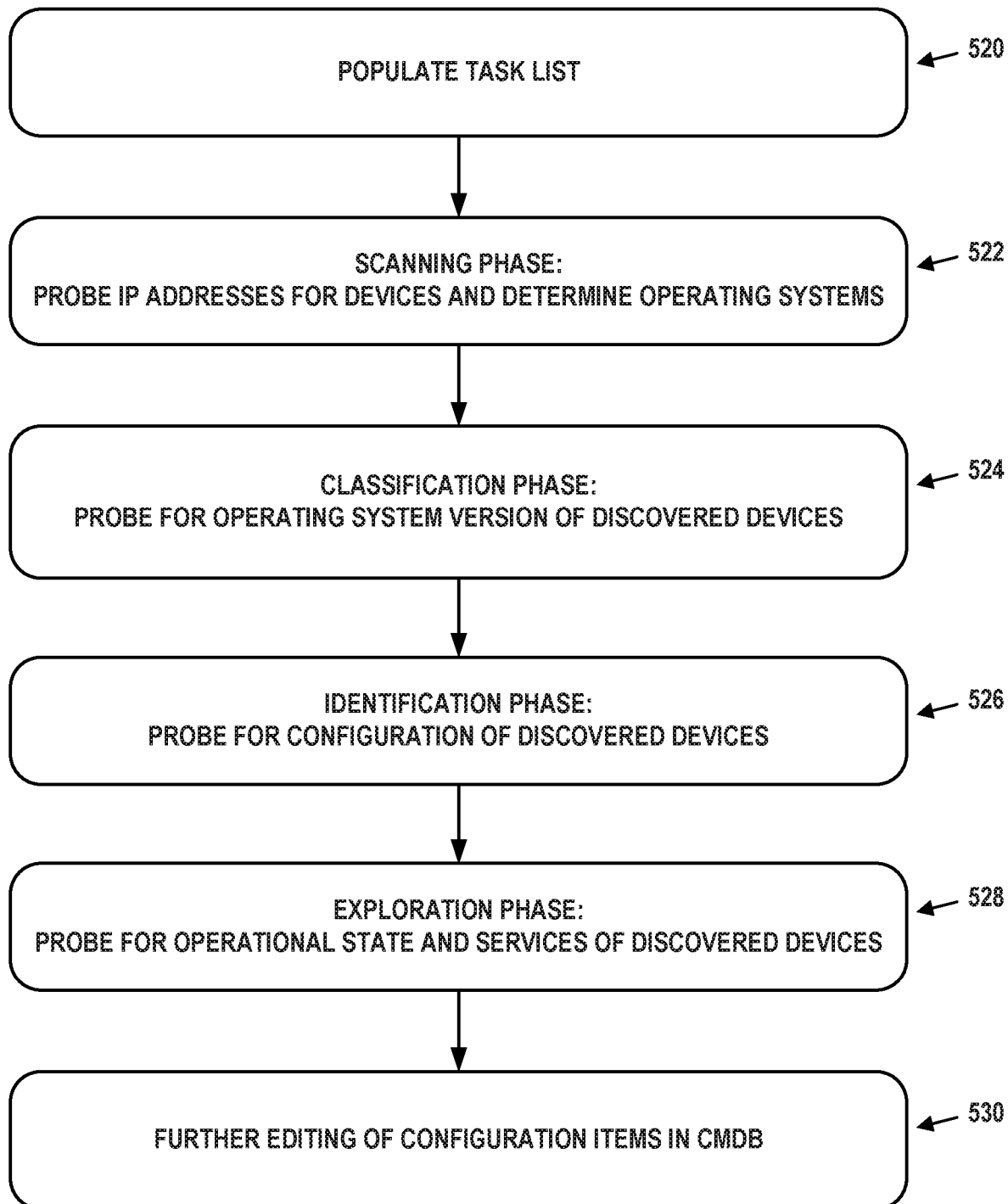
FIG. 5B is a flow chart, in accordance with example embodiments.

The discovery process is depicted as a flow chart in FIG. 5B. At block 520, the task list in the customer instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Discovered Payload Division System and Process

As indicated above, in order for remote network management platform 320 to administer the devices, applications, and services of managed network 300, remote management platform 320 may initiate a discovery process, such as the discovery process described with regard to FIGS. 5A-5B. Particularly, remote network management platform 320 may utilize one or more proxy servers 312 to discover and identify configuration items 410 (e.g., devices, applications, and services) in managed network 300 as well information about configuration items 410, such as the operational status of each configuration item and the associations between configuration items 410. The proxy servers 312 may transmit information regarding discovered configuration items via secured communication sessions with one or more customer instances 322, 324, 326, and 328 of remote management platform 320. As a result, the discovery process may enable remote network management platform 320 to access and represent the current environment of managed network 300 to one or more particular devices.

In some instances, the discovery process may result in the discovery and identification of a large payload of configuration items. In particular, the proxy servers 312 may determine that the payload of discovered configurations items exceed a threshold payload size that represents the amount of information that the communication channel(s) are able to transfer between the proxy servers 312 and one or more servers of remote network management platform 320.

In order to transfer the large payload of configuration items despite the size of the payload exceeding the threshold payload size, the proxy servers 312 may be configured to perform a division process that breaks the payload of configuration items into smaller portions capable of transmission on the communication channel(s). By dividing the payload into smaller portions that are below the threshold payload size, the proxy servers 312 may transfer each portion to one or more servers of remote network management platform 320 until the entire payload is completely transmitted.

In some examples, in order to divide the payload into multiple portions, the proxy servers 312 may generate and utilize a graph that represents the configuration items of the payload as nodes interconnected by unidirectional edges. The edges in the generated graph may represent associations between pairs of configuration items to which they connect. For example, an edge between two nodes may represent the association that exists between the pair of configuration items represented by the two nodes.

In some example embodiments, the associations between pairs of configurations items may be classified either as weak associations or strong associations. A weak association may represent a non-dependency relationship between a pair of configuration items. For example, a webserver may have weak associations to websites that operate via the webserver since the webserver does rely upon any of the websites to operate. By contrast, a strong association may represent a dependency relationship between a pair of configuration items. For example, the websites may have strong associations with the webserver since the websites require the webserver in order to operate. The proxy server may use the strength of associations when dividing the payload of configuration items into multiple portions for a series of transmissions.

After generating the graph depicting the associations between discovered configuration items, the proxy servers 312 may divide the generated graph into overlapping sub-graphs based on associations represented by the edges. For instance, a particular sub-graph may be populated by recursively traversing and copying nodes and edges from the graph as long as nodes in the particular sub-graph represent fewer configuration items than the threshold payload size. By having a size less than the threshold payload size, the configuration items represented by each sub-graph may be transmitted using the communication channel(s) to the one or more server devices of remote network management platform 320.

In some examples, when determining sub-graphs based on the graph of configuration items, each sub-graph may also require that for any first node with an outgoing edge representing a strong association to a second node, the second node is also included in the sub-graph. This way, the strong associations between configuration items may be maintained within sub-graphs and each configuration item that depends on another configuration item can be transmitted with that configuration items. As such, the sub-graphs might not depend on maintaining the weak associations between configuration items in order to ensure that each sub-graph represents an amount of configuration items that falls below the threshold payload size.

The resulting sub-graphs that are developed by dividing the graph may each represent a portion of the original payload of discovered configuration items. As previously indicated, the division of the graph into multiple sub-graphs enables the proxy servers 312 to transmit sets of configuration items as defined in each sub-graph to one or more server devices without the sets of configuration items exceeding the threshold payload size. For instance, the proxy servers 312 may transmit each portion of the payload in a sequential order until the complete payload of configuration items has been transmitted.

In a further example, multiple proxy servers 312 may simultaneously transmit different portions of the payload as defined by the sub-graphs. For instance, a first proxy server 312 may transmit a first portion of the payload as defined by one or more sub-graphs and a second proxy server 312 may transmit a second portion of the payload as defined by one or more other sub-graphs. As a result, proxy servers 312 may transmit the entire payload in an efficient manner.

In some examples, one or more proxy servers 312 may transmit portions of the payload to an external communication channel (ECC) queue that corresponds to a database table. Unlike other tables, in some implementations, the ECC may be queried, updated, and inserted into by other systems (e.g., proxy servers 312). The ECC may further utilize received portions of the payload in various subsequent operations, such as configuring or displaying the portions of the payload via client devices, etc.

In some examples, discovery of configuration items may involve scanning one or more patterns that help organize configuration items. A pattern may represent links between configurations items that were previously defined by a computing device or a user via a user-interface. For example, discovery of configuration items may involve scanning one or more application patterns that link various applications in managed network 300. In turn, the discovery may produce a list of applications operable in managed network 300 as well as associations between the applications.

In another example, discovery of configuration items may involve scanning one or more infrastructure patterns that link hardware operating in managed network 300. For instance, an infrastructure pattern may specify associations between user devices and/or other types of hardware. Discovery involving scanning infrastructure patterns may produce an inventory list of computing devices in managed network 300.

In some example embodiments, discovery may involve scanning multiple types of patterns that exist between configuration items in managed network 300. For instance, discovery may involve scanning both infrastructure and application patterns.

Figure 6A:
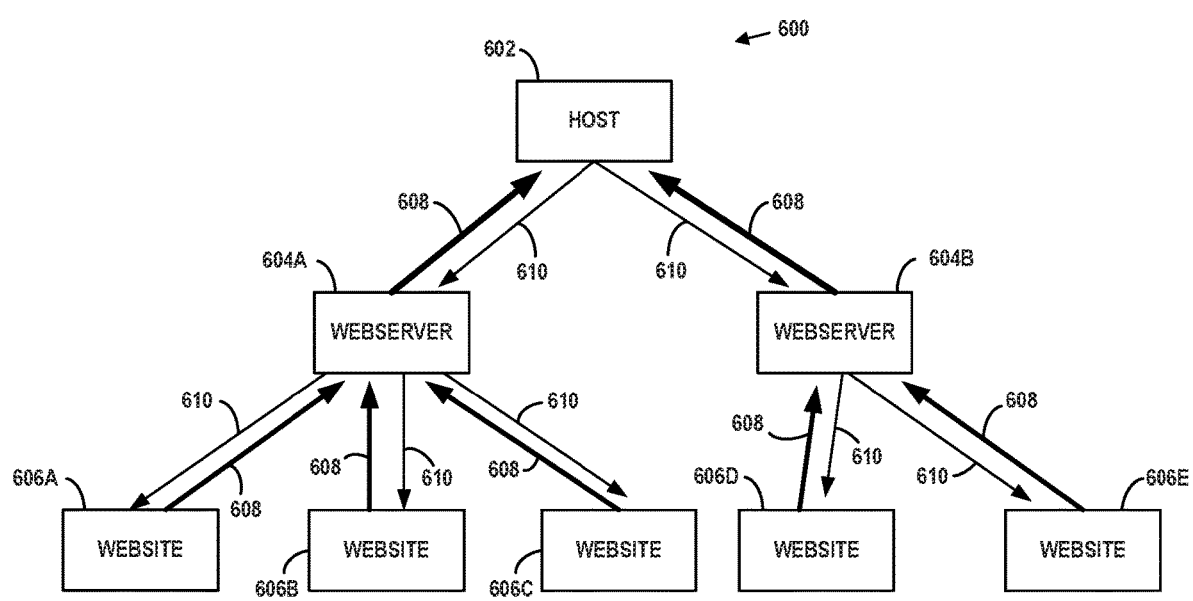
FIG. 6A depicts a graph of discovered configuration items, in accordance with example embodiments.

FIG. 6A depicts a graph of discovered configuration items, in accordance with example embodiments. As indicated above, one or more proxy servers 312 (or another entity) may develop graph 600 subsequent to discovering a payload of configuration items that exceeds a threshold payload size limiting transfer of the payload as a single transmission. Particularly, proxy servers 312 may generate graph 600 such that each node represents a discovered configuration item and the nodes are connected via unidirectional edges that represent associations between pairs of nodes. Other configurations are possible.

Graph 600 includes host 602 represented as a node positioned at the top of graph 600. Host 602 may correspond to a network host that can provide information resources, services, and applications to computing devices or other nodes in managed network 300. As such, managed network 300 may include one or more hosts 602 in some examples. In other examples, the top node or nodes in graph 600 may represent other types of configuration items.

In addition to host 602, additional nodes in graph 600 represent webserver 604A and webserver 604B. Host 602 is connected to each webserver 604A, 604B via unidirectional edges that represent weak associations 610 since host 602 does not depend on either webserver 604A, 604B to operate. Accordingly, in some instances, a subsequently determined sub-graph may include host 602 without either webservers 604A, 604B included.

Additionally, edges representing strong associations 608 are shown extending from each webservers 604A, 604B to host 602. The edges representing strong associations 608 indicate that webservers 604A, 604B may depend on host 602 to operate within managed network 300.

Graph 600 further includes website 606A, website 606B, website 606C, website 606D, and website 606E represented as additional nodes positioned near the bottom of graph 600. Websites 606A-606E may represent various websites or portals that operate within managed network 300. As such, websites 606A-606C are each shown connected to webserver 604A via strong associations 608 and websites 606D, 606E are each shown connected webserver 604B via strong associations 608 since all websites 606A-606E depend on either webservers 604A, 604B to operate within managed network 300.

Conversely, webserver 604A is shown connected via weak associations 610 to websites 606A, 606B, 606C, and webserver 604B is shown connected via weak associations 610 to websites 606E, 606F. Webservers 604A, 604B have weak associations 610 to websites 606A-606E since webservers 604A, 604B generally do not depend on websites 606A-606E to operate.

Figure 6B:
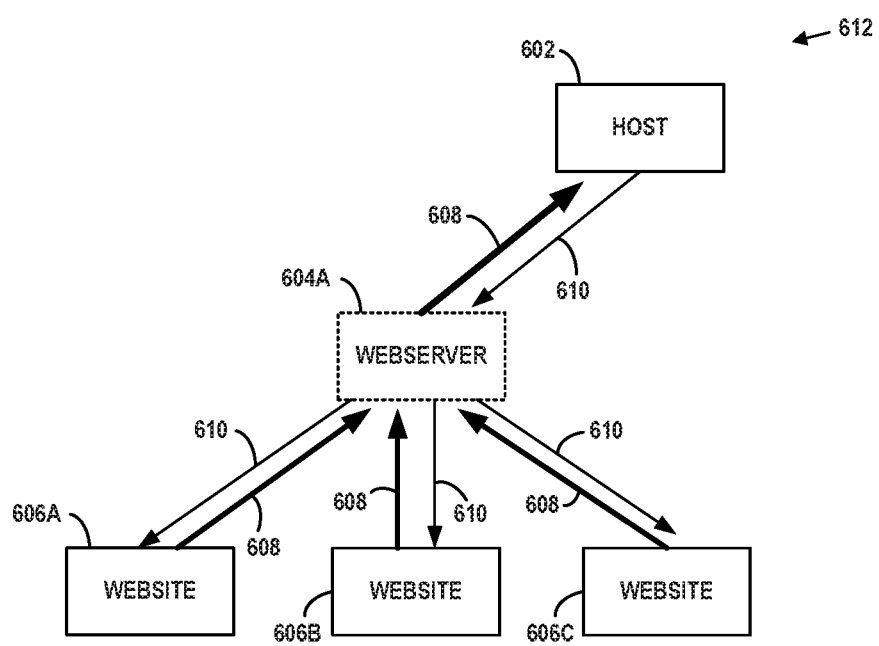
FIG. 6B depicts a sub-graph formed based on the graph of discovered configuration items, in accordance with example embodiments.

FIG. 6B depicts a sub-graph formed based on the graph of discovered configuration items, in accordance with example embodiments. As discussed above, proxy servers 312 in managed network 300 may divide graph 600 into overlapping sub-graphs (e.g., sub-graph 612) based on the associations represented by the edges (e.g., strong associations 608, weak associations 610). Graph 600 may be divided into multiple sub-graphs in response to determining that the payload of discovered configuration items represented in graph 600 exceeds a threshold payload size.

In some examples, sub-graph 612 as well as other sub-graphs developed based on graph 600 may be populated by recursively traversing and copying nodes and edges from graph 600 as long as nodes in sub-graph 612 represent fewer configuration items than the threshold payload size. For example, when the threshold payload size limits transmissions to five or fewer configuration items, sub-graph 612 may be developed such that it includes five or fewer configuration items. Other threshold payload sizes can be used within examples. For instance, an example embodiment may involve using a minimum threshold payload size and a maximum threshold payload size for use during determination of the sub-graphs. The multiple thresholds may improve the efficiency of transferring a large payload of configuration items.

In addition, when determining sub-graph 612 and other sub-graphs based on graph 600, for any first node included in a particular sub-graph with an outgoing edge representing a strong association to a second node, the second node is also included in the particular sub-graph (e.g., sub-graph 612). For example, sub-graph 612 may involve an initial selection of webserver 604A as a first node. Accordingly, when webserver 604 is selected as the first node, host 602 may also be included since webserver 604A is linked to host 602 via a strong association 608 (i.e., webserver 604A depends on host 602).

Additionally, websites 606A, 606B, 606C are shown included in sub-graph 612. Although web server 604A does not depend on web sites 606A, 606B, 606C, one or more of them may be included within the sub-graph 612 depending on the limits set forth by the threshold payload size.

Figure 6C:
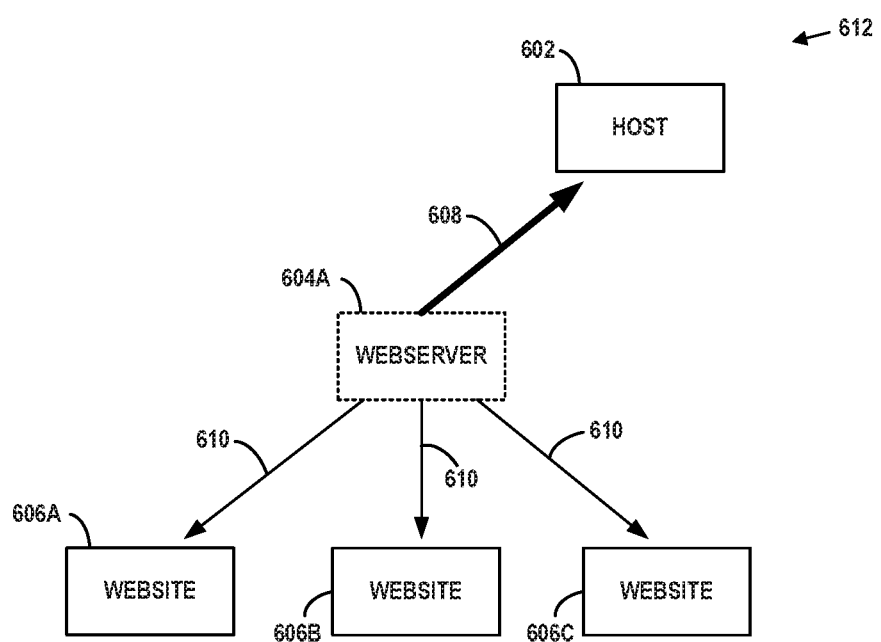
FIG. 6C depicts associations extending from a particular node in the sub-graph formed based on the graph of discovered configuration items, in accordance with example embodiments.

FIG. 6C depicts associations extending from a particular node in the sub-graph formed based on the graph of discovered configuration items, in accordance with example embodiments. The example provided in FIG. 6C depicts webserver 604A as the initially selected node for developing sub-graph 612 based on graph 600. As such, sub-graph further includes the unidirectional edges representing associations that webserver 604A has with other nodes in graph 600.

As shown, host 602 is included in sub-graph 612 since webserver 604A depends on host 602 to operate in managed network 300 as represented by strong association 608. Thus, sub-graph 612 may include at least host 602 and webserver 604A when webserver 604A is selected as the initial node for determining sub-graph 612 based on graph 600.

In addition, FIG. 6C also shows weak associations 610 between webserver 604A and websites 606A, 606B, 606C. In some instances, one or more websites 606A, 606B, 606C may be included in sub-graph 612 depending on the limit placed on transmission sizes represented by the threshold payload size. For example, websites 606A, 606B, 606C may be included with webserver 604A and host 602 when the threshold payload size permits the transmission of at least five configuration items.

Figure 6D:
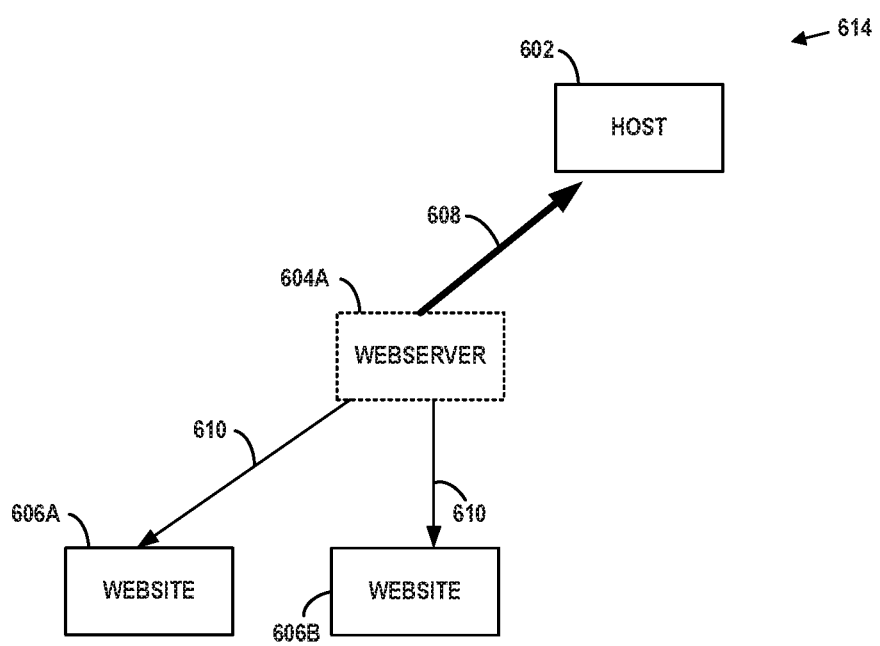
FIG. 6D depicts another sub-graph formed based on the graph of discovered configuration items, in accordance with example embodiments.

FIG. 6D depicts another sub-graph formed based on the graph of discovered configuration items, in accordance with example embodiments. More specifically, sub-graph 614 represents a portion of the configuration items discovered and depicted in graph 600 in a example scenario where the threshold payload size limits portions of the payload to be transmitted with four or less configuration items. As shown, sub-graph 614 includes four configuration items, including host 602, web server 604A, and websites 606A, 606B.

Figure 6E:
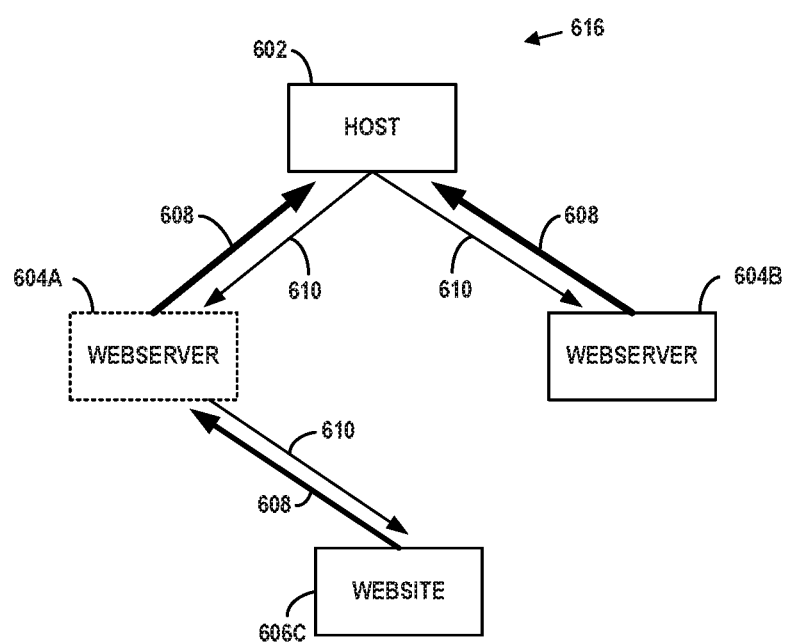
FIG. 6E depicts an additional sub-graph formed based on the graph of discovered configuration items, in accordance with example embodiments.

FIG. 6E depicts an additional sub-graph formed based on the graph of discovered configuration items, in accordance with example embodiments. Sub-graph 616 represents another sub-graph formed based on graph 600 for transmitting a portion of the payload of configuration items. Similar to sub-graph 614 depicted in FIG. 6C, sub-graph 616 includes webserver 604A as the initial node as well as host 602, website 606C, and webserver 604B.

In some examples, proxy servers 312 may determine sub-graph 614 and sub-graph 616 when dividing graph 600. As such, proxy servers 312 may transmit both sub-graphs 614, 616 to server devices in remote network management platform 320. In a further example, an entity may scan and remove duplicate configuration items from sub-graphs 614, 616 to ensure that multiple copies of the same configuration items are not transmitted. In addition, in some examples, remote network management platform 320 may include one or more devices configured to remove duplicate configuration items received within sub-graphs from proxy servers 312.

Figure 6F:
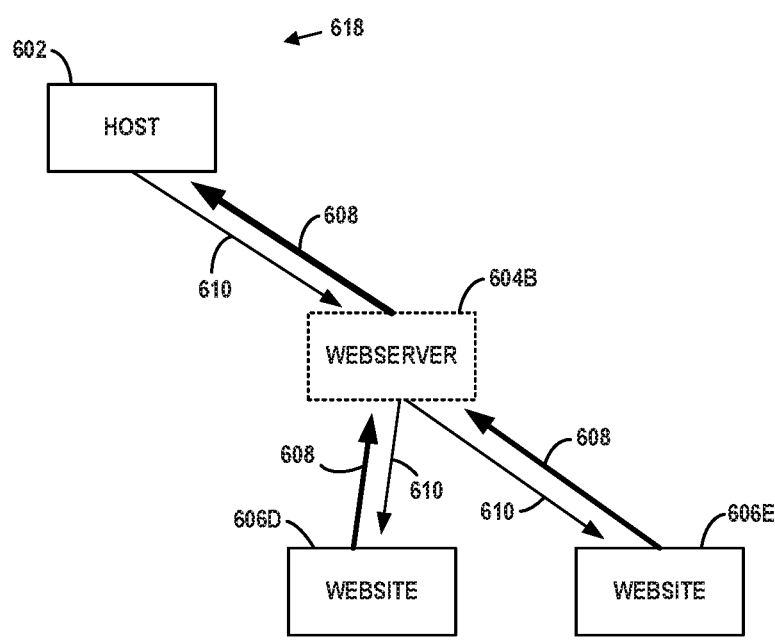
FIG. 6F depicts another sub-graph formed based another particular node in the graph of discovered configuration items, in accordance with example embodiments.

FIG. 6F depicts an additional sub-graph formed based on the graph of discovered configuration items, in accordance with example embodiments. Particularly, sub-graph 618 includes webserver 604B as the initially selected first node and further includes host 602 since webserver 604B depends on host 602 as represented by strong association 608.

In addition, sub-graph 618 also includes websites 606D, 606E since a portion of the payload that includes host 602, webserver 604B, and websites 606D, 606E is less than the example threshold payload size set forth for the example. In other examples, sub-graph 618 may include or less configuration items depending on the transmission limit represented by the threshold payload size.

Figure 6G:
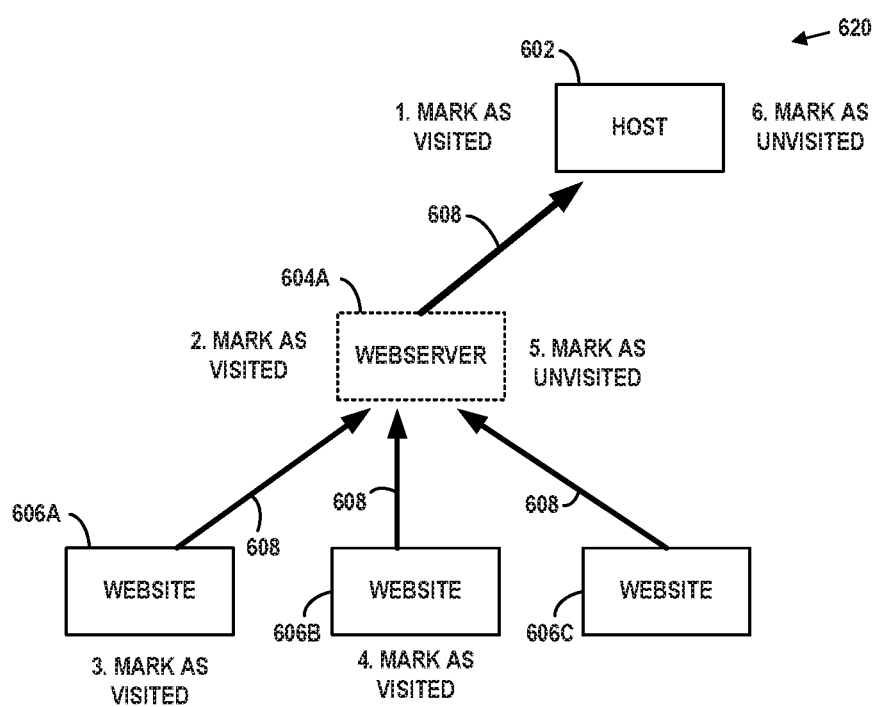
FIG. 6G depicts a depth-first search of the graph of discovered configuration items, in accordance with example embodiments.

FIG. 6G depicts a depth-first search of a portion of the graph of discovered configuration items, in accordance with example embodiments. In particular, portion 620 of graph 600 includes host 602, webserver 604A, website 606A, website 606B, and website 606C represented as nodes. Portion 620 also includes edges representing associations that extend from webserver 604A to other nodes.

When determining sub-graphs based on portion 620 of graph 600, proxy servers 312 may recursively traverse and copy nodes and edges from portion 620 by conducting a depth-first search of portion 620. A depth-first search may involve initially marking all nodes in portion 620 as unvisited.

Proxy servers 312 may proceed with recursively traversing and copying nodes and edges from portion 620 by marking any nodes that were copied as visited. Proxy servers 312, however, may determine that a particular node marked as visited has multiple incoming edges representing strong associations, not all of which are included in a particular sub-graph. As a result, proxy servers 312 may include the particular node in the particular sub-graph and in a subsequent sub-graph that contains the incoming edges representing strong associations that were not included in the particular sub-graph. For instance, proxy servers 312 may mark the particular node as unvisited upon determining that the particular node includes at least one incoming edge representative of a strong association that was not included within the particular sub-graph.

Portion 620 in FIG. 6G indicates an example depth-first search that proxy servers or another entity may perform. Particularly, proxy servers 312 may initially mark all nodes in portion 620 as unvisited. While recursively traversing and copying nodes and edges from portion 620, proxy servers 312 may mark nodes copied into a sub-graph from portion 620 as visited. For instance, in a scenario where the threshold payload size limits sub-graphs to four configuration items or less, proxy servers 312 may divide portion 620 into a first sub-graph that includes host 602, webserver 604A, website 606A, and website 606B. Particularly, proxy servers 312 may select web server 604A as the initial node and mark the node as visited as indicated in step 1 of FIG. 6G.

Proxy servers 312 may also include host 602 in the first sub-graph since webserver 604A depends on host 602 as represented by strong association 608. As such, as shown in FIG. G6, proxy servers 312 may mark host 602 as visited as indicated by step 2. The first sub-graph may also include two more nodes (e.g., website 606A, website 606B) since the first sub-graph can have up to four configuration items as indicated by the threshold payload size used in the example scenario. Particularly, proxy servers 312 may mark web site 606A as visited for step 3 and mark website 606B as visited for step 4. As such, proxy servers 312 may mark all nodes included within the first sub-graph as visited (i.e., all nodes aside from website 606C).

After compiling the first sub-graph, proxy servers 312 may determine that webserver 604A marked as visited includes multiple incoming edges representing strong associations 608 including strong association 608 from website 606C that was not included in the first sub-graph. As a result, proxy servers 312 may include webserver 604A in the first sub-graph and also in a second sub-graph that contains the incoming edge representing strong association 608 from website 606C that was not included in the particular sub-graph. Particularly, step 5 shown in FIG. 6G indicates that proxy servers 312 may mark webserver 604A as unvisited. Proxy servers 312 may also mark host 602 as unvisited for step 6. As a result, proxy server 312 may generate a second sub-graph that includes host 602, webserver 604A, and website 606C. In turn, the first sub-graph and the second sub-graph add together to include all nodes of portion 620. Other examples are possible.

In some examples, JavaScript Object Notation (JSON) can be used to discover and describe configuration items identified in managed network 300. For example, table 1 includes example JSON representations that describe discovered configuration items, such as host 602, webserver 604A, and website 606A. Particularly, the top JSON entry indicates the name, ip_address, the label used within managed network (i.e., host) and indicates that the entry is a configuration item (CI). The middle JSON entry represents information for the discovered webserver and the bottom JSON entry of table 1 represent information for the discovered website.

TABLE 1

"name": "10.1.42.1:5959"
"ip_address": ""10.1.42.1",
"sys_class_name": "host",
"discovery_descriptor": "CI"
"name": "10.1.46.1:5875"
"ip_address": ""10.1.46.1",
"sys_class_name": "webserver",
"discovery_descriptor": "CI"
"name": "10.1.93.1:3257"
"ip_address": ""10.1.93.1",
"sys_class_name": "website",
"discovery_descriptor": "CI"

In addition, table 2 includes example JSON representations that describe associations between the discovered configuration items in table 1. Particularly, each JSON entry connects JSON entries for configuration items via IP addresses included above in table 1 and further indicates the strength of the association (i.e., strong or weak). As shown, the top entry in table 2 represents the strong association extending from the webserver to the host. The second entry from the top represents the weak association extending from the host to the webserver. Similarly, the third and fourth entries represent the strong and weak associations between the webserver and website.

TABLE 2

"link": "10.1.46.1:5875 - 10.1.42.1:5959"
"type": "strong"
"link": "10.1.42.1:5959 - 10.1.46.1:5875 -"
"type": "weak"
"link": "10.1.46.1:5875 - 10.1.93.1:3257"
"type": "weak"
"link": "10.1.93.1:3257 - 10.1.46.1:5875 -"
"type": "strong"

VI. Example Operations

Figure 7:
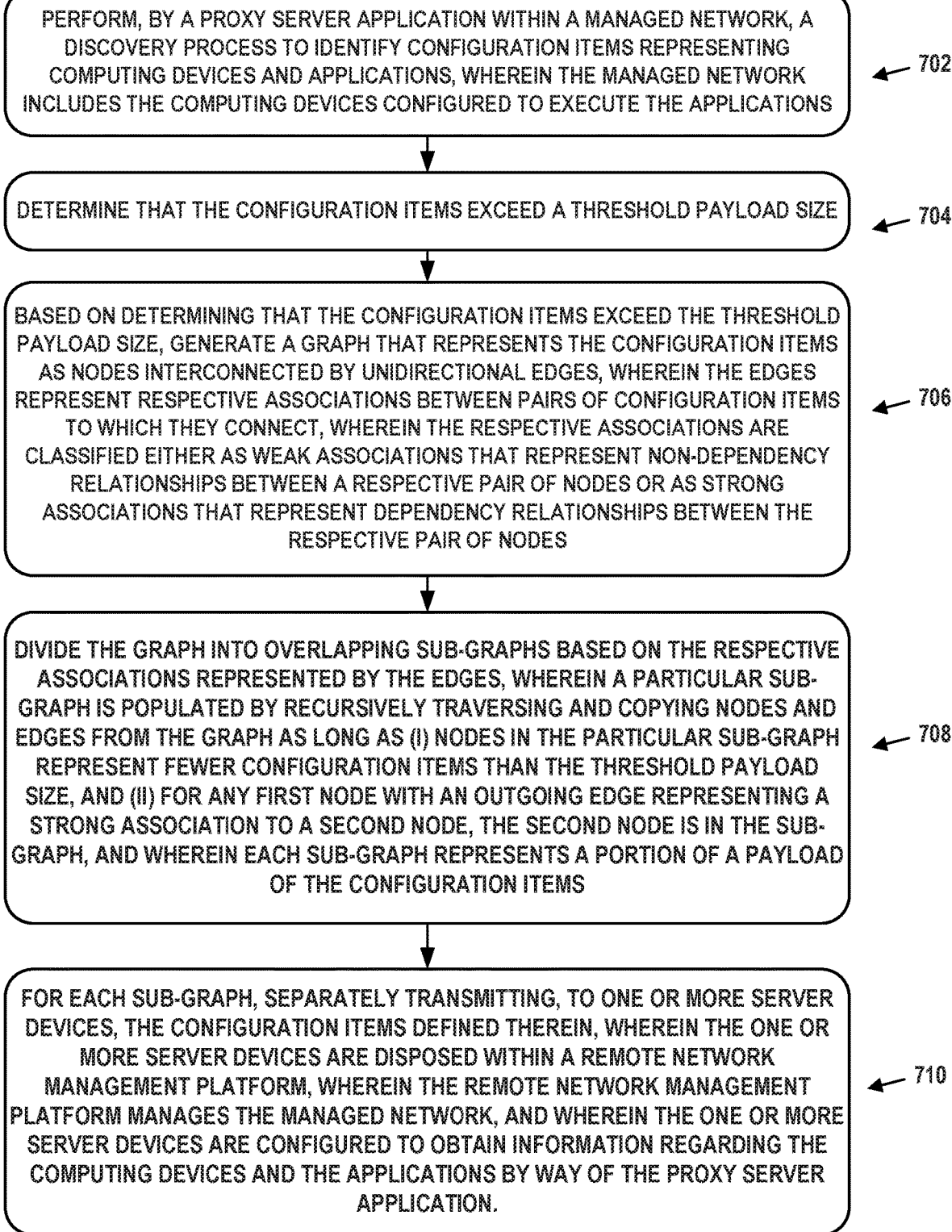
FIG. 7 is a flow chart, in accordance with example embodiments.

FIG. 7 is a flow chart illustrating an example embodiment. The process illustrated by FIG. 7 may be carried out by a computing device, such as computing device 100, and/or a cluster of computing devices, such as server cluster 200 or proxy servers 312. However, the process can be carried out by other types of devices or device subsystems. For example, the process could be carried out by a portable computer, such as a laptop or a tablet device.

The embodiments of FIG. 7 may be simplified by the removal of any one or more of the features shown therein. Further, these embodiments may be combined with features, aspects, and/or implementations of any of the previous figures or otherwise described herein.

Block 702 may involve performing, by a proxy server application within a managed network, a discovery process to identify configuration items representing computing devices and applications. Particularly, the managed network may include the computing devices configured to execute the applications.

In some examples, the discovery process may identify one or more of the configuration items via scanning one or more patterns representative of associations between configuration items in the managed network. For instance, the discovery process may involve scanning one or more application patterns representative of associations between items in the managed network to determine an inventory list of the applications in the managed network. Similarly, the discovery process may also involve scanning one or more infrastructure patterns representative of associations between configuration items in the managed network to determine an inventory list of the computing devices in the managed network.

Block 704 may involve determining that the configuration items exceed a threshold payload size. For instance, the threshold payload size may represent a threshold quantity of configuration items that a communication channel may transfer at a single time. As an example, the threshold payload size may indicate that the communication channel(s) can transfer up to four configuration items at a time.

In some examples, the threshold payload size may be a multiple of an average configuration item size of the configuration items identified via the discovery process. For example, to determine a portion of the payload size, a system may determine the JavaScript Object Notation (JSON) size length of the payload of configuration items (e.g., string length). The system may divide the size length with the total items in the payload to determine the average item size. Here, the associations between the configuration items may not be used when determining the average configuration item size. To determine the total size of portions of the payload, the system may multiple the items size by the determined average item size.

Block 706 may involve, based on determining that the configuration items exceed the threshold payload size, generating a graph that represents the configuration items as nodes interconnected by unidirectional edges. In particular, the edges may represent respective associations between pairs of configuration items to which they connect. The respective associations are classified either as weak associations that represent non-dependency relationships between a respective pair of nodes or as strong associations that represent dependency relationships between the respective pair of nodes.

In an example implementation, generation of the graph may involve creating a graph object that contains the map of nodes. The system may further run over all the associations between configuration items in the discovered payload. For instance, the system may create nodes for configuration items and connect pairs of the nodes via edges based on the associations between the configuration items.

In some examples, the system may utilize one or more previously generated graphs, one or more database or service mappings, or other representations that convey strong and weak connections between configuration items. In a further example, the system may generate one or more graphs along with utilizing one or more previously generated graphs or representations.

Block 708 may involve dividing the graph into overlapping sub-graphs based on the respective associations represented by the edges. A particular sub-graph may be populated by recursively traversing and copying nodes and edges from the graph as long as (i) nodes in the particular sub-graph represent fewer configuration items than the threshold payload size, and (ii) for any first node with an outgoing edge representing a strong association to a second node, the second node is in the sub-graph. For example, recursively traversing and copying nodes and edges from the graph may involve conducting a depth-first search of the graph. As a result, each sub-graph represents a portion of a payload of the configuration items.

In some examples, all nodes in the graph may be initially marked as unvisited. As such, recursively traversing and copying nodes and edges from the graph may involve marking copied nodes as visited and determining that a particular node marked as visited has multiple incoming edges representing strong associations, not all of which are included in the particular sub-graph. Recursively traversing and copying nodes and edges from the graph may further involve marking the particular node as unvisited and including the particular node in the particular sub-graph and in a subsequent sub-graph. The subsequent sub-graph may contain the incoming edges representing strong associations that were not included in the particular sub-graph.

Block 710 may involve separately transmitting, for each sub-graph and to one or more server devices, the configuration items defined therein. The one or more server devices may be disposed within a remote network management platform that manages the managed network. As such, the one or more server devices may be configured to obtain information regarding the computing devices and the applications by way of the proxy server application.

In a further example, a system may include means for splitting network discovery payloads based on degree of relationships between nodes. The system may include means for performing a discovery process to identify configuration items representing computing devices and applications. The computing devices and applications may operate within a managed network.

The system may also include means for determining that the configuration items exceed a threshold payload size, and means for generating a graph that represents the configuration items as nodes interconnected by unidirectional edges based on determining that the configuration items exceed the threshold payload size. In particular, the edges may represent respective associations between pairs of configuration items to which they connect, and the respective associations are classified either as weak associations that represent non-dependency relationships between a respective pair of nodes or as strong associations that represent dependency relationships between the respective pair of nodes.

The system may also include means for dividing the graph into overlapping sub-graphs based on the respective associations represented by the edges. A particular sub-graph may be populated by recursively traversing and copying nodes and edges from the graph as long as (i) nodes in the particular sub-graph represent fewer configuration items than the threshold payload size, and (ii) for any first node with an outgoing edge representing a strong association to a second node, the second node is in the sub-graph. As a result, each sub-graph represents a portion of a payload of the configuration items.

The system may also include means for separately transmitting, for each sub-graph and to one or more server devices, the configuration items defined therein. Particularly, the one or more server devices may be disposed within a remote network management platform that manages the managed network, and the one or more server devices may be configured to obtain information regarding the computing devices and the applications by way of the proxy server application.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
a client device configured to run a proxy server application for a managed network, wherein the client device is configured to receive information associated with one more computing devices and one or more applications in the managed network, and wherein running the proxy server application causes the client device to perform operations comprising:
performing a discovery process to identify configuration items representing the one or more computing devices and the one or more applications;
determining that a payload of the configuration items exceeds a threshold quantity of configuration items; and
transmitting, to one or more server devices, respective portions of the payload of the configuration items in response to determining that the payload exceeds the threshold quantity of configuration items, wherein each portion of the respective portions is associated with a sub-graph of a graph that represents the configuration items as nodes interconnected by unidirectional edges indicative of whether each pair of nodes has an operationally dependent relationship or an operationally independent relationship, and wherein the graph is divided into overlapping sub-graphs based on the operationally dependent relationship or the operationally independent relationship of each pair of nodes.

2. The system of claim 1, wherein the operations comprise dividing the payload of the configuration items into the respective portions in response to determining that the payload of the configuration items exceeds the threshold quantity of configuration items.

3. The system of claim 2, wherein dividing the payload of the configuration items into the respective portions comprises generating the graph and dividing the graph into the overlapping sub-graphs.

4. The system of claim 1, wherein a particular overlapping sub-graph of the overlapping sub-graphs is populated by recursively traversing and copying one or more nodes and one or more edges from the graph.

5. The system of claim 4, wherein the one or more nodes in the particular overlapping sub-graph represents fewer configuration items than the threshold quantity of configuration items.

6. The system of claim 4, wherein a first node of the particular overlapping sub-graph has an outgoing edge representing an operationally dependent relationship to a second node, and the second node is included in the particular overlapping sub-graph.

7. The system of claim 1, wherein the respective portions of the payload of configuration items are separately transmitted to the one or more server devices.

8. A method, comprising:
performing a discovery process to identify configuration items representing one or more computing devices and one or more applications in a managed network;

determining that a payload of the configuration items exceeds a threshold quantity of configuration items; and transmitting, to one or more server devices, respective portions of the payload of the configuration items in response to determining that the payload exceeds the threshold quantity of configuration items, wherein each portion of the respective portions is associated with a sub-graph of a graph that represents the configuration items as nodes interconnected by unidirectional edges indicative of whether each pair of nodes has an operationally dependent relationship or an operationally independent relationship, and wherein the graph is divided into overlapping sub-graphs based on the operationally dependent relationship or the operationally independent relationship of each pair of nodes.

9. The method of claim 8, wherein the operations comprise dividing the payload of the configuration items into the respective portions in response to determining that the payload of the configuration items exceeds the threshold quantity of configuration items.

10. The method of claim 9, wherein dividing the payload of the configuration items into the respective portions comprises generating the graph and dividing the graph into the overlapping sub-graphs.

11. The method of claim 8, wherein a particular overlapping sub-graph of the overlapping sub-graphs is populated by recursively traversing and copying one or more nodes and one or more edges from the graph.

12. The method of claim 11, wherein the one or more nodes in the particular overlapping sub-graph represents fewer configuration items than the threshold quantity of configuration items and represents more configuration items than a minimum threshold quantity of configuration items.

13. The method of claim 11, wherein a first node of the particular overlapping sub-graph has an outgoing edge representing an operationally dependent relationship to a second node, and the second node is included in the particular overlapping sub-graph.

14. The method of claim 8, comprising removing one or more nodes from two or more overlapping sub-graphs of the overlapping sub-graphs before separately transmitting the respective portions of the payload of the configuration items, wherein the one or more nodes represent respective duplicate configuration items.

15. A non-transitory, computer-readable medium, comprising instructions that when executed by one or more processors, cause the one or more processors to perform operations comprising:

performing a discovery process to identify configuration items representing one or more computing devices and one or more applications in a managed network;

determining that a payload of the configuration items exceeds a threshold quantity of configuration items;

dividing the payload of the configuration items into respective portions in response to determining that the payload of the configuration items exceeds the threshold quality of configuration items; and transmitting, to one or more server devices, the respective portions of the payload of the configuration items in response to determining that the payload exceeds the threshold quantity of configuration items, wherein each portion of the respective portions is associated with a sub-graph of a graph that represents the configuration items as nodes interconnected by unidirectional edges indicative of whether each pair of nodes has an operationally dependent relationship or an operationally independent relationship, and wherein the graph is divided into overlapping sub-graphs based on the operationally dependent relationship or the operationally independent relationship of each pair of nodes.

16. The non-transitory, computer-readable medium of claim 15, wherein dividing the payload of the configuration items into the respective portions comprises generating the graph and dividing the graph into the overlapping sub-graphs.

17. The non-transitory, computer-readable medium of claim 15, wherein the threshold quantity of configuration items is a multiple of an average configuration item size of the configuration items identified via the discovery process.

18. The non-transitory, computer-readable medium of claim 15, wherein a particular overlapping sub-graph of the overlapping sub-graphs is populated by recursively traversing and copying one or more nodes and one or more edges from the graph.

19. The non-transitory, computer-readable medium of claim 18, wherein a first node of the particular overlapping sub-graph has an outgoing edge representing an operationally dependent relationship to a second node, and the second node is included in the particular overlapping sub-graph.

20. The non-transitory, computer-readable medium of claim 15, wherein the respective portions of the payload of configuration items are separately and simultaneously transmitted to the one or more server devices.

* * * * *